Aug. 27, 1957 — T. P. CLARK — 2,803,949
AUXILIARY FISH LADDERS
Filed June 12, 1956 — 2 Sheets-Sheet 1
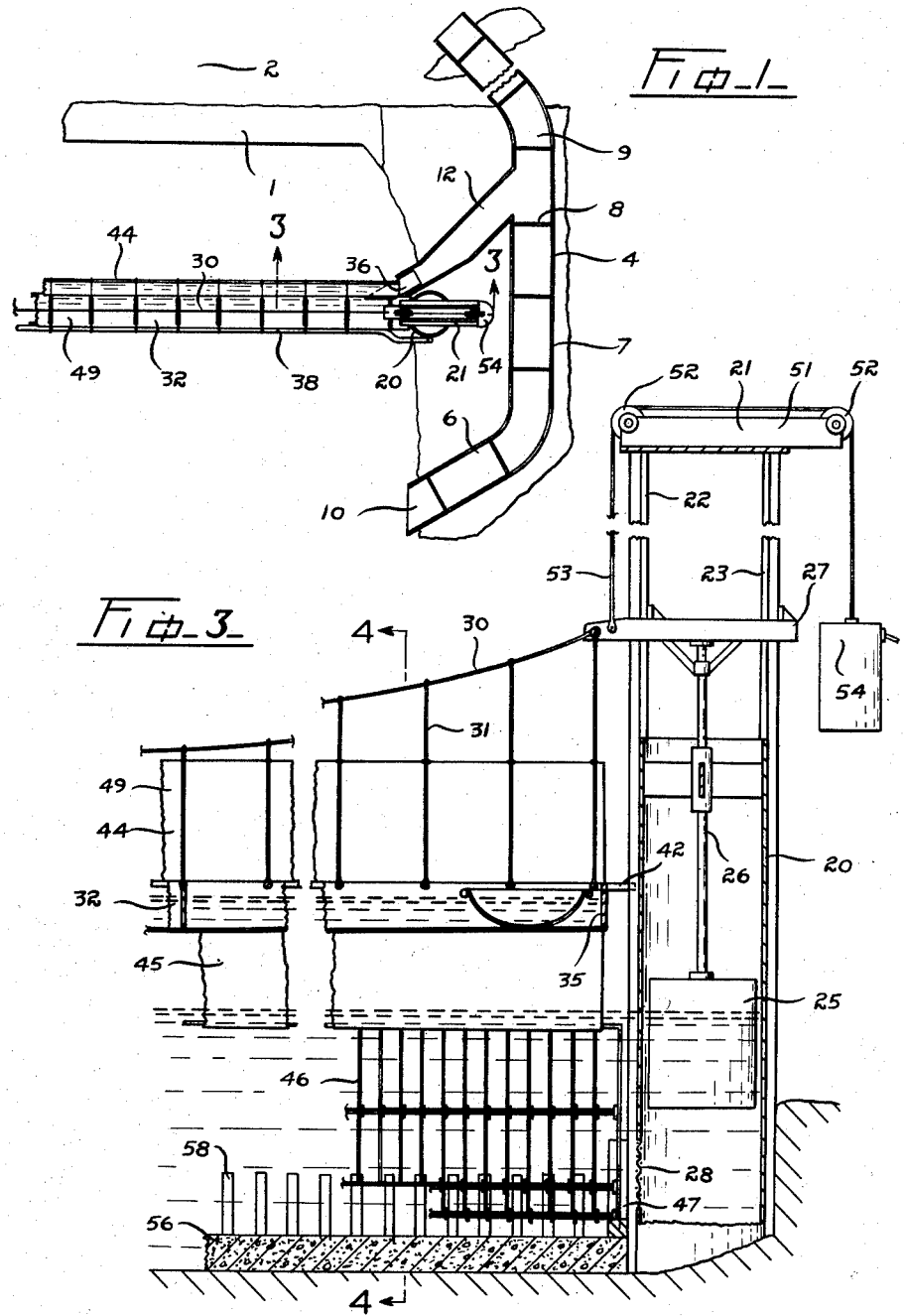
INVENTOR
TREVOR P. CLARK
ATTORNEY Aug. 27, 1957  T. P. CLARK  2,803,949
AUXILIARY FISH LADDERS
Filed June 12, 1956  2 Sheets-Sheet 2
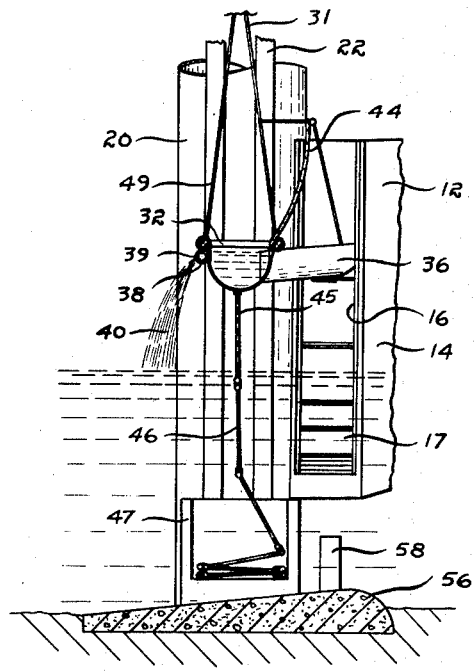
Fig_4_
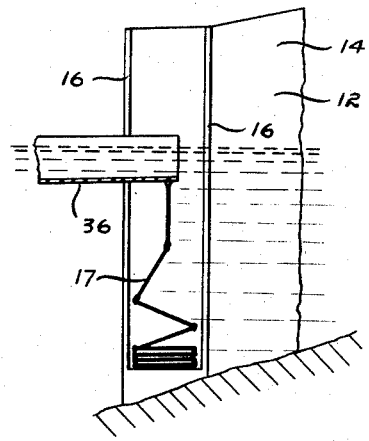
Fig_5_
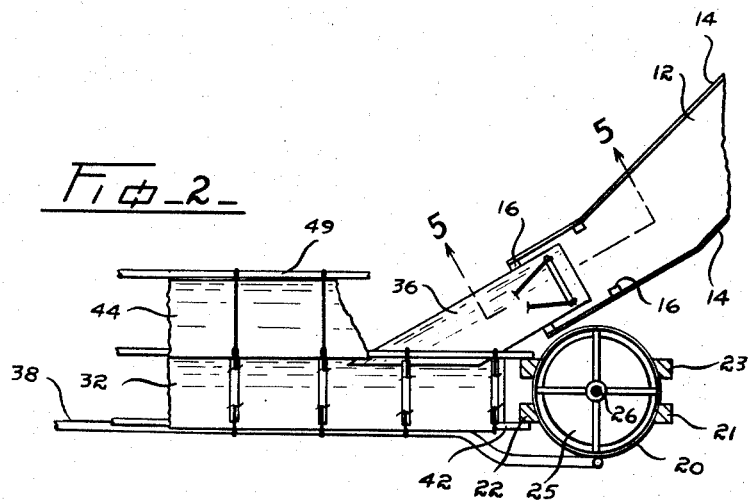
Fig_2_
INVENTOR
TREVOR P. CLARK
ATTORNEY

# United States Patent Office 2,803,949
Patented Aug. 27, 1957

2,803,949

AUXILIARY FISH LADDERS

Trevor P. Clark, North Vancouver, British Columbia, Canada

Application June 12, 1956, Serial No. 590,971

8 Claims. (Cl. 61—21)

My invention relates to improvements in auxiliary fish ladders.

The invention is designed to make it possible for salmon and other fish to get back to the spawning grounds, or the place from whence they were hatched, past dams and other structures which are erected to maintain a water head for power purposes.

The invention here shown takes into consideration the fact that salmon prefer to swim in water relatively close to the surface and will not generally go below fifteen feet of the surface and also recognizes that the lower inlet to a fish ladder is usually some hundreds of feet below the dam and that salmon desirous of attaining the higher reaches of the river will pass the entrance to the fish ladder and swim up to the very turbulent waters at the foot of the dam, and since by nature they will not in spawning time stay in stagnant water or swim with the current, many of them will become exhausted and die in close proximity of the downstream face of the dam.

The object of the invention is to provide intersecting means between the outfall of the fish ladder and the foot of the dam where fish can, by continually facing upstream, jump into a channel which will deliver them into the fish ladder at a point closer to the dam than the normal entrance.

Other objects will appear as the specification proceeds.

Referring to the accompanying drawings:

Figure 1 is a part plan of the invention.

Figure 2 is an enlarged plan showing the intersection of the transfer channel to the fish ladder.

Figure 3 is an enlarged transverse section taken on the line 3—3 of Figure 1.

Figure 4 is an enlarged section taken on the line 4—4 of Figure 3.

Figure 5 is an enlarged section taken on the line 5—5 of Figure 2.

In the drawings like characters of reference indicate corresponding parts in each figure.

The numeral 1, see Figure 1, indicates a dam extending across a river or other body of water 2. The water from above the dam is in part allowed to run into a fish ladder 4 and is controlled as to volume by any suitable means, not shown.

The fish ladder is in effect a flume having side walls 6 and 7 and transverse baffles 8 at intervals of its length to provide a succession of pools 9 each having its normal water surface somewhat lower than the next pool nearest the upper end of the fish ladder. As is usual, the length of the fish ladder is extensive in order that the rise between the adjacent pools 9 may be not greater than salmon are capable of conveniently jumping. The length of the fish ladder makes it necessary for said ladder to discharge as at 10 back into the river a considerable distance from the foot of the dam. Communicating with the fish ladder below the dam is a by-pass chamber 12 having side walls 14 which rise to the height of the top of the walls 6 and 7 at the point of communication therewith and extend downwardly to substantially the mean level of the lower pound. The free ends of the chamber walls 14 are provided on their inner sides with spaced vertical cleats 16 which form guides for a folding screen 17, the purpose of which will hereinafter appear.

Suitably spaced caissons 20, one only shown, are erected across the river below the dam. The distance that the caissons are disposed from the dam is preferably such as to include all of that area of water which, having come over the spillway, is highly turbulent and a substantial area of relatively smooth water, all of which will here be referred to as the lower pound. A tower 21 is erected upon each caisson 20, which tower includes vertical guides 22 and 23. Disposed in each caisson 20 is a float 25 which is fitted with a vertically extending plunger 26 having a crosshead 27 at its upper end, the ends of said crosshead being guided vertically in the guides 22 and 23. The caisson is apertured adjacent its lower end as at 28 so that the level of the water in said caisson will be exactly that of the lower pound or the river therebeyond. Connected between the inner ends of the crossheads 27 is a cable 30 from which a plurality of vertical cables 31 are suspended and at the lower ends of the vertical cables a trough 32 extends. The trough 32 may be semi-circular in form as shown in Figure 4 with the vertical cables 31 connecting both sides of the trough to hold it against rocking. End walls 35, one only shown, are fitted to the trough and a gutter 36 somewhat less in cross section than the trough 32 communicates with said trough and extends into the chamber 12 between the cleats 16. The gutter is rigidly connected to the trough 32 and rises and falls therewith, and the folding screen 17 is attached to the underside of said gutter to close the opening between the side walls 14 of the by-pass chamber 12 as the trough 32 is raised or lowered in response to change in water level below the lower pound. A horizontal pipe 38 extends along an edge of the trough 32 which is apertured at intervals as at 39 to provide small water falls 40 dropping into the river a short distance above the water level. The pipe 38 is fed with water from any suitable source of supply which may be taken from above the dam 1 and supplied through a rubber or other hose, not shown. The trough is fitted with appropriate members 42 which project into the guides 22 to hold said trough against movement due to wind or force of water. A substantially vertical shield 44 is supported on the side of the trough nearest the dam which serves to prevent a fish having made an exceptionally long jump from falling into the lower pound. Beneath the trough 32 a curtain 45 of cloth or a longitudinally arranged strip of thin metal, is suspended and from the lower edge of this curtain a foraminous folding screen 46 is suspended. The screen 46 is preferably of long wire racks hinged together as shown in Figures 3 and 4, with the spaces therein small enough to prevent salmon from passing therethrough. Cleats 47, see Figure 4, are secured upon the caissons in spaced relation to keep the screens in position when they fold incidental to the lowering of the trough 32 and the floats 25, as shown in Figure 4. The trough 32, the curtain 45, the foraminous screen and all associated parts suspended from the crossheads 27 will be hereinafter referred to as the trough assembly 49.

Each tower 21 is provided with a cantilever beam 51 supporting a pair of sheaves 52 over which a cable 53 is trained. This cable is connected at one end to the crosshead 27 and is provided at the opposite end with a counterweight 54. Since the weight to be counterbalanced will increase as the trough 32 and its depending parts are raised, I prefer to use heavy tanks for the counterweights 54 which can be loaded with water from a convenient source of supply as required to counter the increasing weight as the foraminous screen 46 unfolds from the sill 56 below the trough assembly.

A row of stakes 58 is erected in close proximity to the folding screens 46 and on the up side of said screen to prevent damage which may occur to the screen in the event of a log coming over the dam and striking the folded portion of said screen.

It will be apparent that at any stage of water level the water in the chamber 12 will be substantially at the level of the top of the trough 32, since the folding screen 17 below the gutter 36 prevents water from leaking away into the lower pound. The difference in water level between said gutter and by-pass chamber 12 and the lower pound will be approximately two feet, and since water flowing from the by-pass chamber 12 into the trough will be allowed to spill over the edge of the trough into the body of water any salmon swimming close to said overflow or the water emanating from the apertures 39 of the pipe 38 will be induced to jump up into said trough and pass through the gutter, thence through the by-pass chamber 12 and up the fish ladder to pass out into the water above the dam.

The counterweighting of the trough assembly 49 is such as to allow the lower portion of the curtain 45 to be immersed into the water to prevent substantial current flow down stream at the water level adjacent said curtain, so that any fish adjacent this curtain may rest prior to leaping to the trough above. It will be understood that as the water level of the pound drops, a proportionate drop will take place in the by-pass chamber and consequently the floats will descend further into the caissons 20, so that the height of leap into the trough will be substantially constant and all fish which may have moved upstream beyond the discharge 10 of the fish ladder 4 will be able to get into said fish ladder at a point intermediate its length.

It will be noticed that the fish will be enabled to swim at their desired depth below surface irrespective of the depth of the stream adjacent the foot of the fish ladder and the trough assembly.

What I claim as my invention is:

1. An auxiliary fish ladder comprising in combination with an existing fish ladder connecting water bodies above and below a dam, a by-pass chamber in communication with the existing fish ladder between its upper and lower ends, a trough assembly extending across the lower water body, said assembly having a trough, a curtain below said trough and a foraminous screen below said curtain adapted to prevent the passage of fish upstream beyond the trough, means for supporting the trough above the surface of the lower water body, and means for delivering water from the by-pass chamber to the trough.

2. An auxiliary fish ladder as claimed in claim 1, wherein means are provided for raising and lowering the trough to maintain said trough at a substantially predetermined height above the level of the lower water body.

3. An auxiliary fish ladder as claimed in claim 1, wherein a float is provided to raise the level of the trough as the water level in the lower water body is raised.

4. An auxiliary fish ladder as claimed in claim 3, wherein a counterweight is used to relieve the load upon the float and said counterweight is a hollow vessel adapted to be loaded by adding a liquid thereto.

5. An auxiliary fish ladder comprising in combination with an existing fish ladder connecting water bodies above and below a dam, a by-pass chamber in communication with the existing fish ladder intermediate its length, said by-pass chamber having a pair of side walls open at one end to the level of the low water body at its normal highest and lowest point, a gutter extending through said open ends adapted to deliver water from the by-pass chamber, a folding screen extending from the gutter to the base of said chamber to substantially close the opening through said side walls below water level, a curtain extending across the low water body adjacent the by-pass chamber, said curtain extending below water line to a point below which salmon usually swim, a trough carried parallel to said curtain and above the level of the water in which it is immersed, said trough being in communication with the gutter and being adapted to spill water derived from the existing fish ladder in close proximity to the curtain.

6. An auxiliary fish ladder as claimed in claim 5, wherein means are provided to raise the trough, the gutter and the curtain.

7. An auxiliary fish ladder as claimed in claim 5, wherein a caisson is provided adjacent an end of the trough, which caisson is in water communication with the low water body, said caisson enclosing a float, said float being operatively connected with the trough and the curtain to maintain them in relative juxtaposition with the level of the low water body as the depth of said water body fluctuates.

8. In an auxiliary fish ladder connected with an existing fish ladder intermediate its height, said auxiliary fish ladder including a chamber deriving a supply of water from the existing ladder, said existing ladder connecting an upper water body with a low water body, a pair of caissons on opposite sides of the lower water body, vertical guides carried by the caissons forming towers, each caisson having a float and each float having a plunger carrying a crosshead movable within the guides, said crossheads being connected together by cable means, extending across said low water body, a horizontal trough and a curtain suspended from said cable means, means connecting the trough with the chamber to receive water therefrom, said trough being suspended above the surface level of the low water body and said curtain being suspended on edge and partly immersed in said low water body, said trough and curtain being adapted for vertical movement as the floats are affected by the rise and fall of water in the caissons.

No references cited.